(12) United States Patent
Masatsugu et al.

(10) Patent No.: US 12,203,641 B2
(45) Date of Patent: Jan. 21, 2025

(54) VEHICLE INTERIOR PANEL

(71) Applicant: TOYODA GOSEI CO., LTD., Kiyosu (JP)

(72) Inventors: Yoshinori Masatsugu, Kiyosu (JP);
Yusuke Ueshima, Kiyosu (JP);
Takayuki Kamiya, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/437,432

(22) Filed: Feb. 9, 2024

(65) Prior Publication Data
US 2024/0280249 A1  Aug. 22, 2024

(30) Foreign Application Priority Data
Feb. 22, 2023 (JP) .................. 2023-026098

(51) Int. Cl.
| | |
|---|---|
| *F21V 23/04* | (2006.01) |
| *B60K 35/21* | (2024.01) |
| *B60K 35/28* | (2024.01) |
| *F21V 11/08* | (2006.01) |

(52) U.S. Cl.
CPC .......... *F21V 23/0485* (2013.01); *B60K 35/21* (2024.01); *B60K 35/28* (2024.01); *F21V 11/08* (2013.01); *B60K 2360/1434* (2024.01)

(58) Field of Classification Search
CPC ...... F21V 23/0485; F21V 11/08; F21V 11/00; F21V 99/00; B60K 35/28; B60K 35/21; B60K 2360/1434; B60K 35/20; B60K 35/10; B60K 35/00; G02F 1/133602; G02F 1/133603; G02F 1/133606
See application file for complete search history.

(56) References Cited

U.S. PATENT DOCUMENTS

| | | | |
|---|---|---|---|
| 10,195,943 B1* | 2/2019 | Park .................. | B60K 35/00 |
| 2001/0030871 A1* | 10/2001 | Anderson, Jr. ......... | H01H 9/18 |
| | | | 362/489 |
| 2013/0076503 A1* | 3/2013 | Ishii .................. | B60K 35/60 |
| | | | 340/458 |
| 2017/0120810 A1* | 5/2017 | Twork ................ | B60Q 3/745 |

FOREIGN PATENT DOCUMENTS

JP  2006-321336 A  11/2006

\* cited by examiner

*Primary Examiner* — Bao Q Truong
(74) *Attorney, Agent, or Firm* — Posz Law Group, PLC (57) ABSTRACT

A vehicle interior panel has a front surface as a design surface. The vehicle interior panel includes a base material being in a plate-shape and having optical transparency, a decorative layer provided on a first surface of the base material and having optical transparency, the first surface being a surface on the front surface side, and a pattern portion provided on a second surface of the base material and having a pattern that is displayed on the front surface by emission of light from a side opposite to the front surface. The second surface is opposite to the first surface. The pattern portion includes a gradation portion in which light transmittance continuously changes in a planar direction. A gradation pattern is displayed on the front surface by emission of light from the side opposite to the front surface to the gradation portion.

7 Claims, 9 Drawing Sheets

VEHICLE INTERIOR PANEL

CROSS-REFERENCE TO RELATED APPLICATIONS

This application is based on and claims priority under 35 USC 119 from Japanese Patent Application No. 2023-026098 filed on Feb. 22, 2023, the entire content of which is incorporated herein by reference.

TECHNICAL FIELD

The present disclosure relates to a vehicle interior panel.

BACKGROUND ART

There is known a switch device for a vehicle which includes a decorative panel applied with a pattern or a color and having transparency, and a light source disposed on a back side of the decorative panel, and in which a pattern of a switch is displayed on a front side of the decorative panel when the light source is turned on (see JP2006-321336A).

In the switch device for a vehicle described in JP2006-321336A, only the pattern or color applied to the decorative panel appears on the front side of the decorative panel when the light source is turned off. According to JP2006-321336A, since the pattern of the switch is not displayed when the light source is turned off, it is possible to prevent a complicated impression from being given, and it is possible to improve a design property of interior of the vehicle by the switch device.

However, in the switch device described in JP2006-321336A, under an environment with little external light, such as at night, since it is difficult to visually recognize the pattern and the color of the decorative panel and only the design of the switch is visually recognized, the design property of the decorative panel is reduced.

SUMMARY OF INVENTION

An object of the present disclosure is to provide a vehicle interior panel capable of maintaining a high design property even under an environment with little external light such as at night.

In order to achieve the above object, an aspect of the present disclosure provides the following vehicle interior panel.

[1] A vehicle interior panel having a front surface as a design surface, including:
a base material being in a plate-shape and having optical transparency;
a decorative layer provided on a first surface of the base material and having optical transparency, the first surface being a surface on the front surface side; and
a pattern portion provided on a second surface of the base material and having a pattern that is displayed on the front surface by emission of light from a side opposite to the front surface, the second surface being opposite to the first surface,
in which the pattern portion includes a gradation portion in which light transmittance continuously changes in a planar direction, and
a gradation pattern is displayed on the front surface by emission of light from the side opposite to the front surface to the gradation portion.

[2] The vehicle interior panel according to [1], in which the front surface includes a first display portion on which a pattern of a switch of an electronic device is displayed and a second display portion on which a pattern of the pattern portion is displayed due to application of light.

[3] The vehicle interior panel according to [2], further including: a touch sensor configured to detect a touch operation on the first display portion, in which the pattern of the pattern portion is displayed on the second display portion due to the application of light, as an answer back, in response to detection of the touch operation on the first display portion by the touch sensor.

[4] The vehicle interior panel according to [2], in which at least a part of the gradation pattern has a gradation in brightness, in an area of the second display portion adjacent to the first display portion, in which brightness on a side closed to the first display portion is low and brightness on a side of a center of the second display portion is high.

[5] The vehicle interior panel according to [2], further including: a switch pattern portion provided between the base material and the decorative layer and having a pattern of the switch displayed on the first display portion by emission of light from the side opposite to the front surface; and a wall-like light shielding member provided to surround a periphery of a space of the pattern portion on the side opposite to the front surface.

[6] The vehicle interior panel according to any one of [1] to [5], in which the pattern portion is a gradation sheet.

[7] The vehicle interior panel according to any one of [1] to [5], in which the pattern portion is a transparent member including a protrusion serving as the gradation portion, and the protrusion has an inclined surface inclined with respect to the second surface.

According to the present disclosure, it is possible to provide the vehicle interior panel capable of maintaining a high design property even under an environment with little external light such as at night.

BRIEF DESCRIPTION OF DRAWINGS

Exemplary embodiment(s) of the present invention will be described in detail based on the following figures, wherein.

DESCRIPTION OF EMBODIMENTS

<Configuration of Light Emitting Device>

Figure 1:
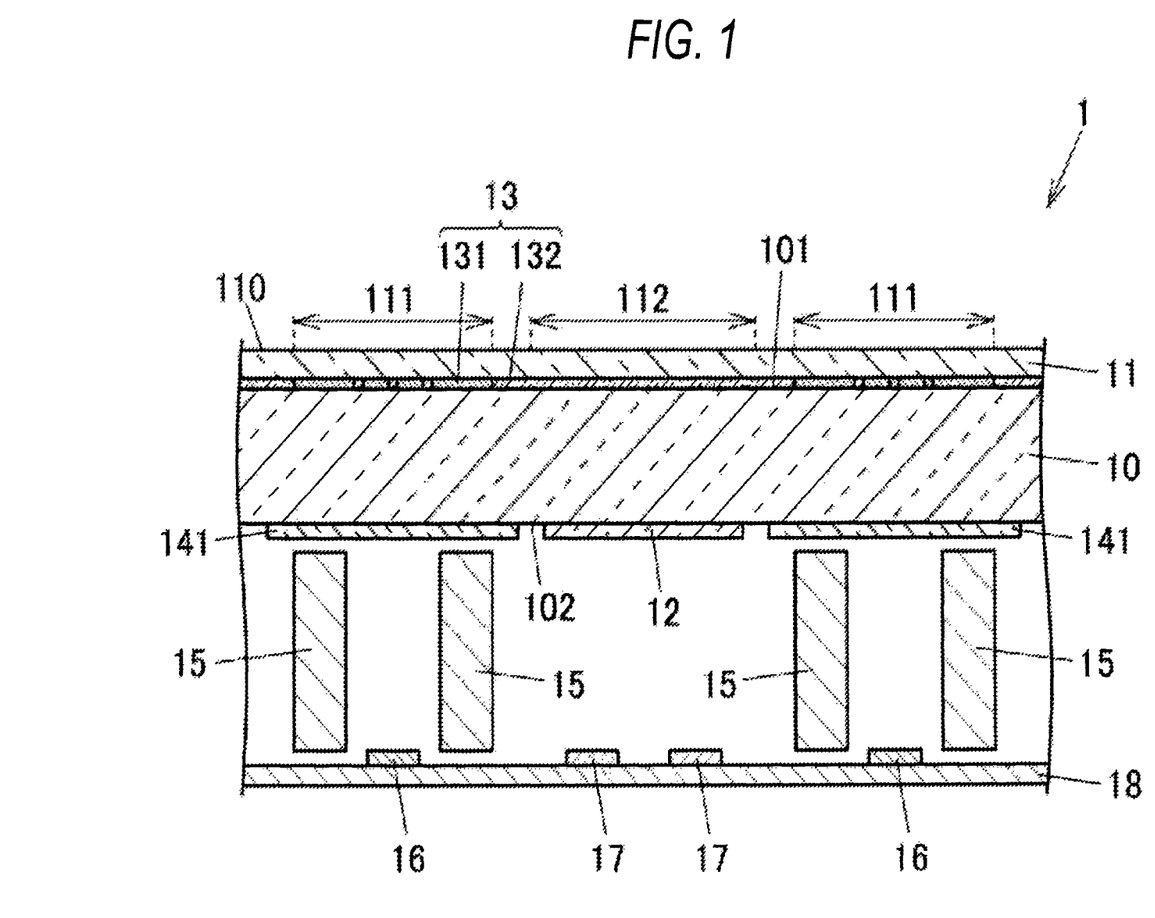
FIG. 1 is a vertical cross-sectional view of a part of a vehicle interior panel according to an embodiment of the present disclosure.

FIG. 1 is a vertical cross-sectional view of a part of a vehicle interior panel 1 according to an embodiment of the present disclosure. The vehicle interior panel 1 is a vehicle interior panel having a front surface 110 as a design surface, and includes a plate-shaped base material 10 having optical transparency, a decorative layer 11 that has optical transparency and is provided on a first surface 101 which is a surface on the front surface 110 side of the base material 10, and a gradation sheet 12 that is provided on a second surface 102 on an opposite side to the first surface 101 of the base material 10 and serves as a pattern portion having a pattern to be displayed on the front surface 110 by emission of light from a side opposite to the front surface 110 (that is, a lower side in FIG. 1).

The gradation sheet 12 is a sheet made of resin, glass, or the like that includes a gradation portion in which light transmittance continuously changes in a planar direction in at least a part thereof. When the gradation portion of the gradation sheet 12 is applied with light from a lower side, a gradation pattern 113 is displayed on the front surface 110 by light emission.

The gradation sheet 12 is provided on the second surface 102 instead of the first surface 101 of the base material 10 in order to clearly display the gradation pattern 113 on the front surface 110. By disposing the gradation sheet 12 on the second surface 102 side of the base material 10, a surface on a light entering side of the gradation sheet 12 becomes a boundary surface with an air layer (a space in which air exists between the base material 10 and the substrate 18 to be described later), and thus a light diffusion effect due to the unevenness of the front surface of the gradation sheet 12 is obtained. Therefore, the gradation pattern 113 in which brightness of the light changes in the planar direction can be clearly displayed. Further, by providing the gradation sheet 12 on the second surface 102, a sense of depth is generated in the pattern of the gradation sheet 12 displayed on the front surface 110.

The decorative layer 11 has a pattern that is visible from the front surface 110 side by emission of light from the front surface 110 side, for example, an entirely formed pattern such as a wood grain pattern. That is, the pattern of the decorative layer 11 can be visually recognized in an environment where there is a large amount of external light such as daytime. On the other hand, under an environment with less external light such as nighttime, the visibility of the pattern of the decorative layer 11 is low, but the pattern of the gradation sheet 12 displayed on the front surface 110 by light emission has high visibility. That is, according to the vehicle interior panel 1, it is possible to maintain a high design property even under an environment with less external light such as at nighttime.

The decorative layer 11 is formed of a transparent sheet to which decoration is applied, for example, a decoration sheet which is decorative with transparent ink, or artificial permeable leather. The decorative layer 11 may be colorless or colored, and may have any color in a case of a colored color. The decorative layer 11 transmits visible light emitted by a first light emitting element 16 and a second light emitting element 17 to be described later.

In the example illustrated in FIG. 1, since the vehicle interior panel 1 has the decorative layer 11 as the outermost surface, the front surface of the decorative layer 11 becomes the front surface 110 of the vehicle interior panel 1. When another layer such as a transparent film is provided on the decorative layer 11, the front surface of the layer serves as the front surface 110 of the vehicle interior panel 1.

In the vehicle interior panel 1 according to the present embodiment, the front surface 110 includes first display portions 111 on which a pattern of a switch is displayed for an operation of an electronic device mounted in a vehicle, for example, temperature adjustment or air volume adjustment of an air conditioner, an operation of a defroster, a defogger, a deicer, brightness adjustment of illumination, position adjustment of an in-vehicle component such as an electric center console box, and the like, and second display portions 112 on which the pattern of the gradation sheet 12 is displayed due to application of light.

As will be described later, by performing a touch operation using patterns of switches displayed on the first display portion 111 as a mark, it is possible to operate various electronic devices corresponding to the patterns of the switches.

Figure 2A:
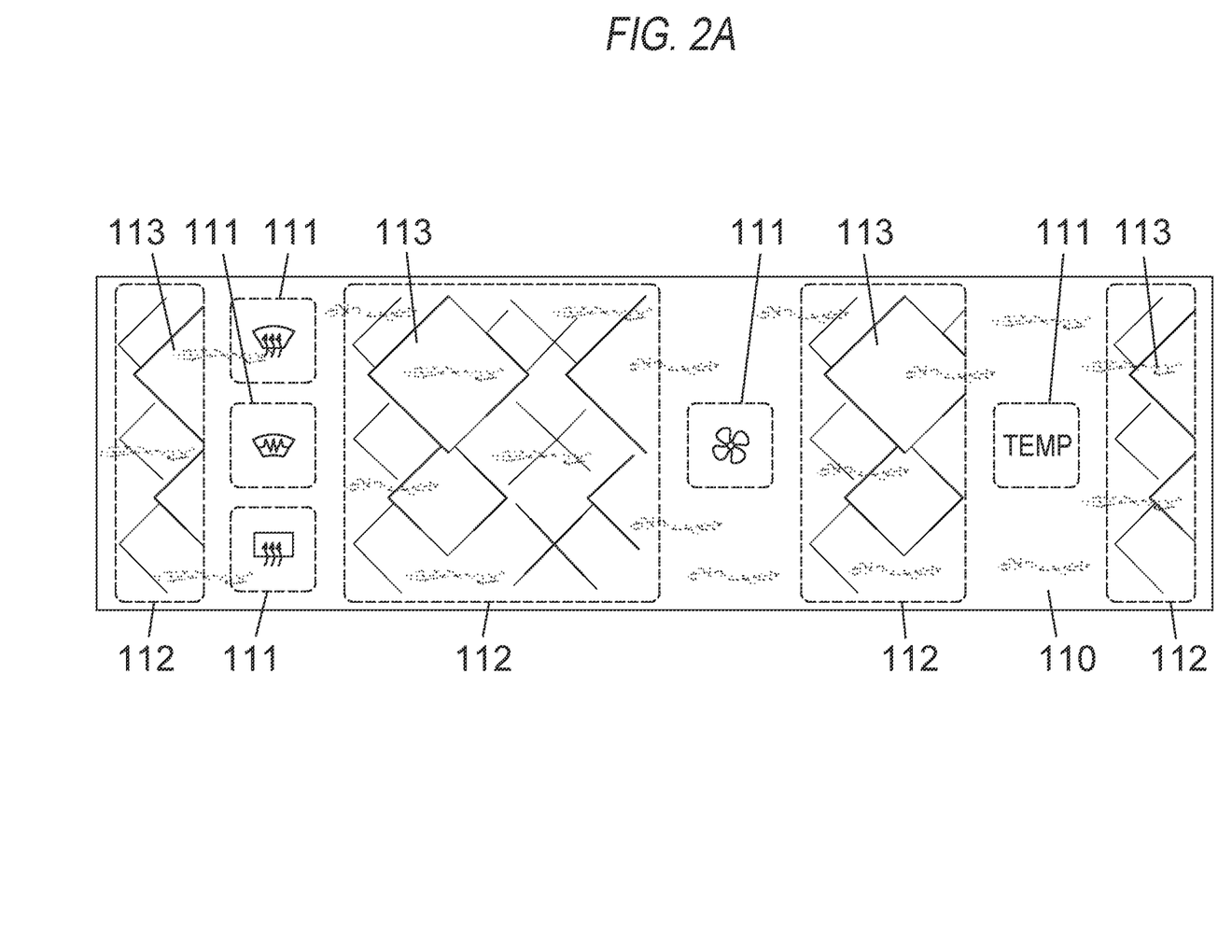
FIG. 2A is a plan view illustrating an arrangement example of first display portions and second display portions included in a front surface of the vehicle interior panel.

FIG. 2A is a plan view illustrating an arrangement example of the first display portions 111 and the second display portions 112 included in the front surface 110 of the vehicle interior panel 1. In the example illustrated in FIG. 2A, three first display portions 111 on which a defroster switch mark, a deicer switch mark, and a defogger switch mark are displayed are disposed on a left side, the first display portion 111 on which a switch mark for adjusting the air volume of the air conditioner is displayed is disposed on a right side of the three first display portions 111 with the second display portion 112 interposed therebetween, and the first display portion 111 on which a switch mark for adjusting the temperature of the air conditioner is displayed is further disposed on a right side of the first display portion 111 with the second display portion 112 interposed therebetween.

Figure 2B:
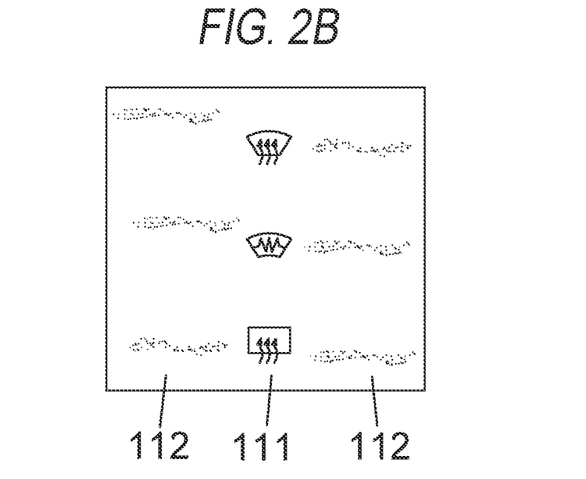
FIG. 2B is a plan view illustrating the second display portion in a state where a pattern of a gradation sheet is not displayed.
Figure 2C:
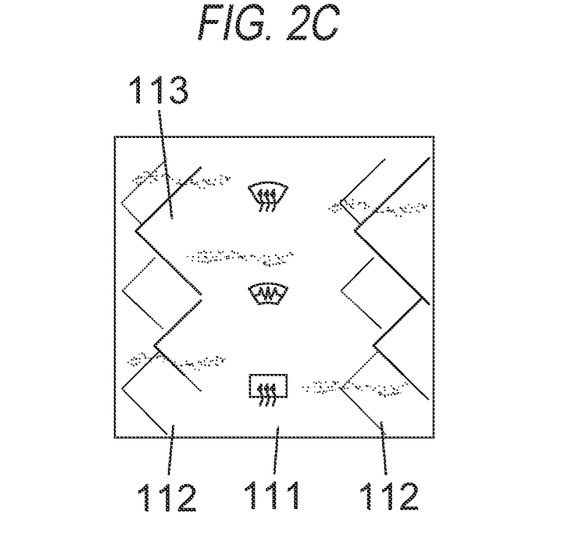
FIG. 2C is a plan view illustrating the second display portion in a state where the pattern of the gradation sheet is displayed due to the application of light.

FIG. 2B is a plan view illustrating the second display portions 112 on which the pattern of the gradation sheet 12 is not displayed, and FIG. 2C is a plan view illustrating the second display portions 112 on which the pattern of the gradation sheet 12 is displayed due to application of light. As described later, when the light-display of the second display portion 112 is used as an answer back of the touch operation on the first display portion 111, FIG. 2B illustrates a state in which the touch operation is not performed, and FIG. 2C illustrates a state immediately after the touch operation is performed.

As illustrated in the second display portion 112 on a left side of FIG. 2C, at least a part of the gradation pattern 113 preferably has a gradation in brightness, in an area of the second display portion 112 adjacent to the first display portion 111, in which the brightness on a side closed to the first display portion 111 is low and the brightness on a side closed to a center of the second display portion 112 is high. In this case, a boundary between the first display portion 111 and the second display portion 112 is made inconspicuous when the second display portion 112 is light-displayed by the application of light, and the design property can be further improved.

Figure 3:
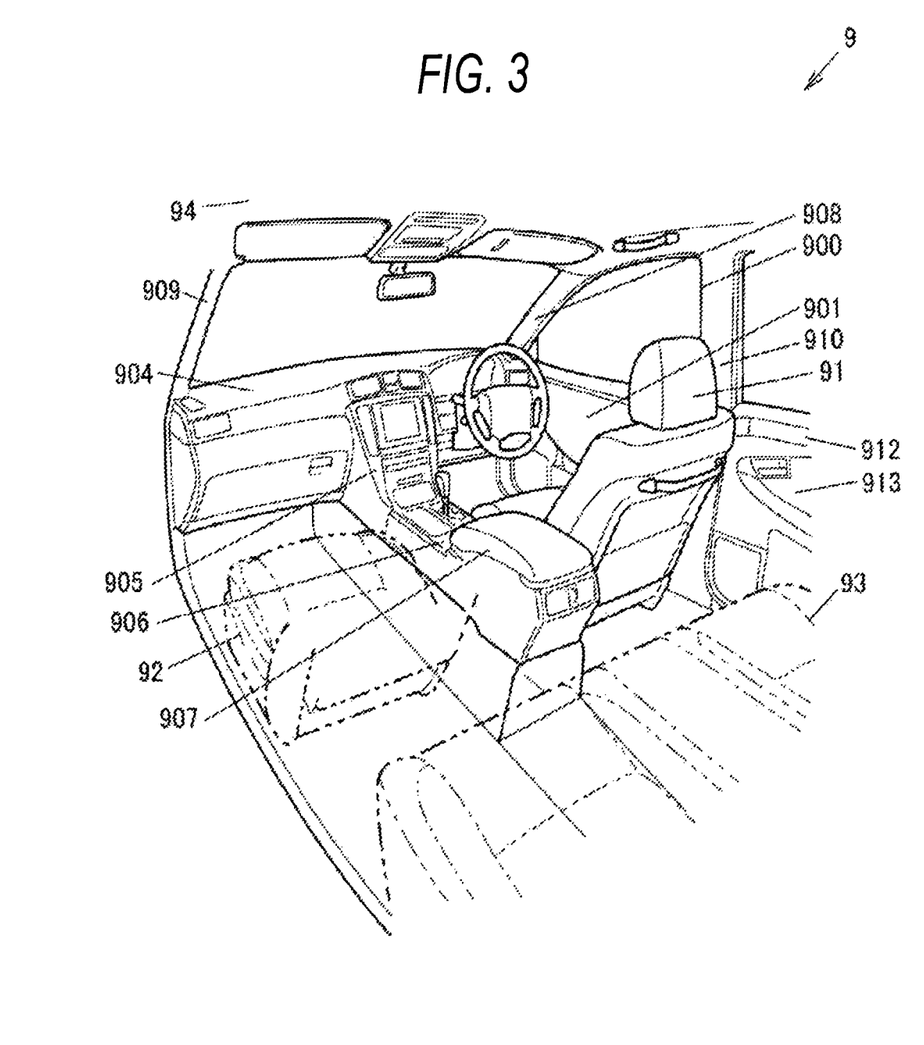
FIG. 3 is a view illustrating an example of an interior of a vehicle on which the vehicle interior panel is mounted.

FIG. 3 is a view illustrating an example of an interior of a vehicle 9 on which the vehicle interior panel 1 is mounted. The vehicle interior panel 1 can be attached to components such as a door 900 on a driver's seat 91 side, a door on a front passenger seat 92 side, an instrument panel 904, a center console 905, a floor console 906, a console box 907, an A pillar 908 on the driver's seat 91 side, an A pillar 909 on the front passenger seat 92 side, a B pillar 910 on the driver's seat 91 side, a B pillar on the front passenger seat 92 side, left and right doors 912 on a rear seat 93 side, and a ceiling 94. The front surface 110 of the vehicle interior panel 1 is a part of a front surface of a component to which the vehicle interior panel 1 is attached.

Figure 4A:
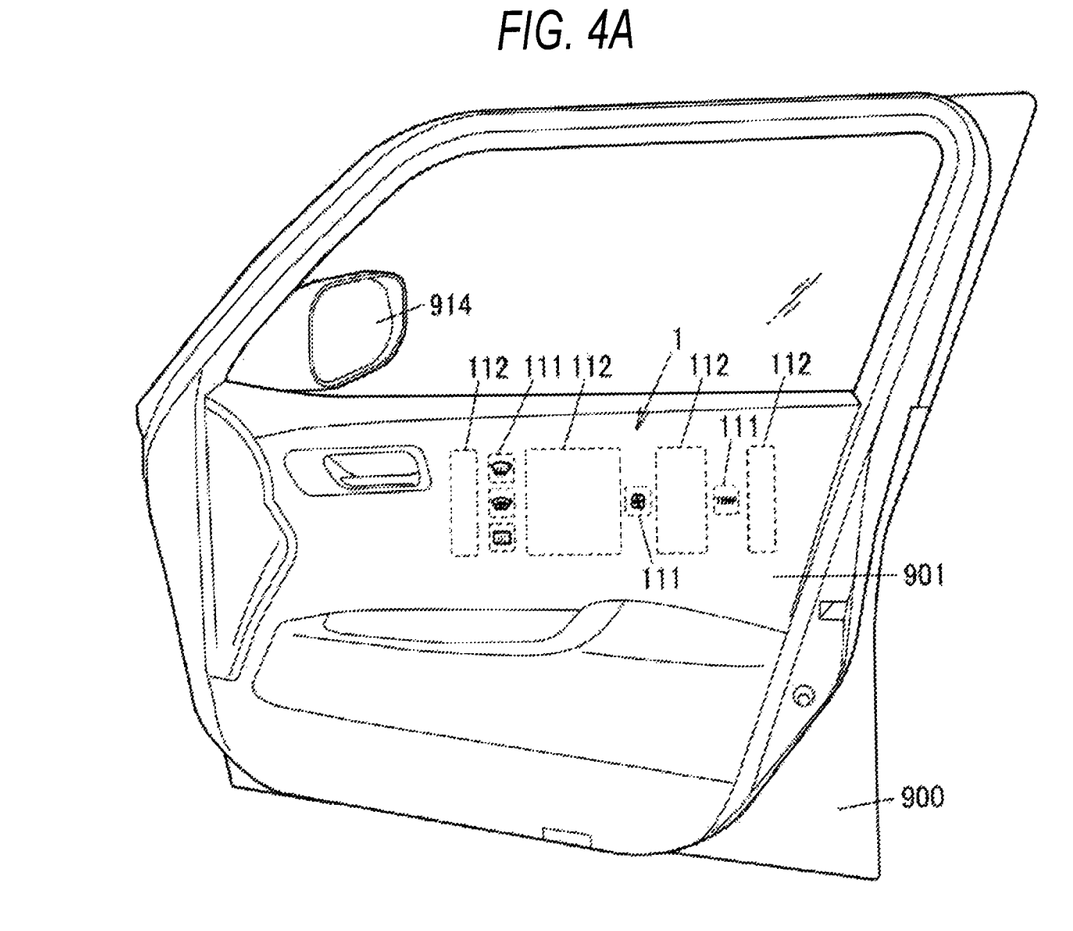
FIG. 4A is a view illustrating an example of a door on a driver's seat side where the vehicle interior panel is disposed.
Figure 4B:
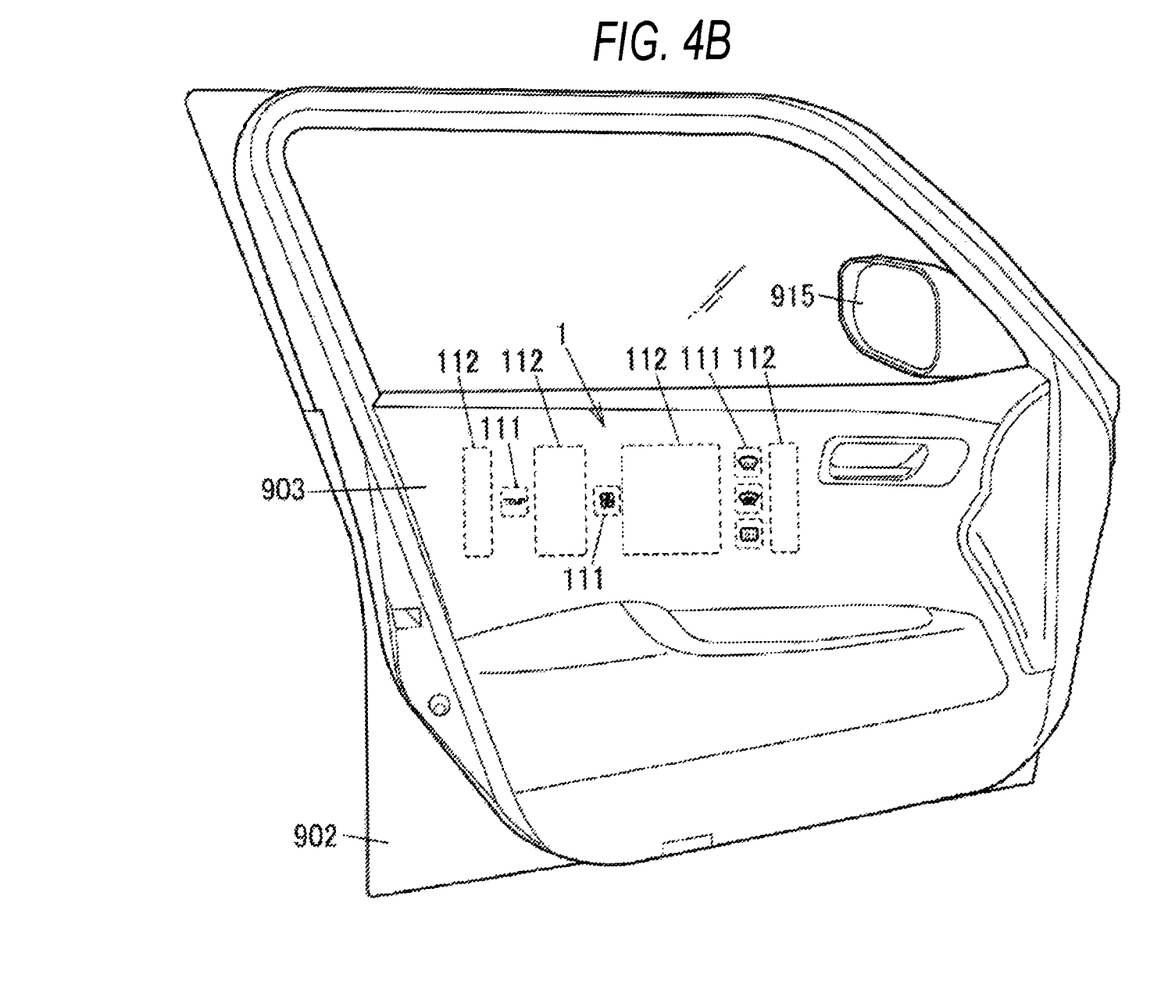
FIG. 4B is a view illustrating an example of a door on a front passenger seat side where the vehicle interior panel is disposed.

FIG. 4A is a view illustrating an example of the door 900 on the driver's seat 91 side where the vehicle interior panel 1 is disposed, and FIG. 4B is a view illustrating an example of the door 902 on the front passenger seat 92 side where the vehicle interior panel 1 is disposed. As illustrated in FIG. 4A, when the vehicle interior panel 1 is attached to the door 900, the vehicle interior panel 1 is typically attached to a door trim 901 of the door 900. As illustrated in FIG. 4B, when the vehicle interior panel 1 is attached to the door 902, the vehicle interior panel 1 is typically attached to a door trim 903 of the door 902. Similarly, when the vehicle interior panel 1 is attached to the door 912 on the rear seat 93 side, the vehicle interior panel 1 is attached to a door trim 913 of the door 912.

As illustrated in FIG. 1, a filter layer 13 is provided between the base material 10 and the decorative layer 11, in which a light shielding portion 131 having a low light transmittance and a light transmitting portion 132 having a high light transmittance are arranged in a predetermined planar pattern. The filter layer 13 may be provided on a back surface of the decorative layer 11 and attached to the base material 10 together with the decorative layer 11, or may be provided on the first surface 101 of the base material 10 before the decorative layer 11 is attached.

An area of the filter layer 13 below the first display portion 111 functions as a switch pattern portion having a pattern of a switch which is displayed on the first display portion 111 due to application of light. In the switch pattern portion of the filter layer 13, the light transmitting portion 132 is arranged in a pattern of the pattern of the switch, and the light shielding portion 131 is arranged in the other area. Further, by applying light from the side opposite to the front surface 110 (the lower side in FIG. 1) to the switch pattern portion of the filter layer 13, the pattern of the switch is displayed on the first display portion 111 due to the application of light.

In the area of the filter layer 13 below the second display portion 112, in order to display the pattern of the gradation sheet 12 on the second display portion 112 due to the application of light, for example, the light transmitting portion 132 is disposed below an area where the second display portion 112 emits light, and the light shielding portion 131 is disposed below an area where the second display portion 112 does not emit light. In addition, when the entire area of the second display portion 112 is caused to emit light, only the light transmitting portion 132 may be disposed in an area of the filter layer 13 below the first display portion 111.

The pattern of the switch displayed on the first display portion 111 may be displayed by a method other than the application of light, such as by printing. In this case, the filter layer 13 may not be included in the vehicle interior panel 1.

The vehicle interior panel 1 includes the first light emitting elements 16 for emitting light to the switch pattern portion of the filter layer 13 from below and displaying the pattern of the switch on the first display portion 111 due to the application of light, and the second light emitting elements 17 for emitting light to the gradation sheet 12 from below and displaying the pattern of the gradation sheet 12 on the second display portion 112 due to the application of light. The first light emitting element 16 and the second light emitting element 17 are mounted on the second surface 102 side of the base material 10, that is, the substrate 18 such as a printed circuit board installed below the base material 10.

The first light emitting element 16 and the second light emitting element 17 are typically light emitting diode (LED) chips, but are not limited thereto, and may be, for example, laser diode (LD) chips. Emission colors of the first light emitting element 16 and the second light emitting element 17 are not particularly limited, and may be elements capable of emitting a plurality of colors, such as full-color LEDs.

A plurality of second light emitting elements 17 are preferably provided to illuminate the gradation sheet 12 on a surface. In this case, by controlling a timing of lighting the plurality of second light emitting elements 17, it is possible to apply a motion to the pattern light-displayed on the second display portion 112.

The first light emitting elements 16 and the second light emitting elements 17 mounted on the substrate 18 may be components that are not included in the vehicle interior panel 1 and that are attached to the vehicle in combination with the vehicle interior panel 1.

The base material 10 is made of a material transparent to visible light emitted by the first light emitting element 16 and the second light emitting element 17, for example, a resin such as a polycarbonate (PC) resin or a polymethyl methacrylate (PMMA) resin.

As illustrated in FIG. 1, the vehicle interior panel 1 preferably includes a wall-like light shielding member 15 provided to surround a space of the gradation sheet 12 on a side opposite to the front surface 110, that is, a space below the gradation sheet 12 illustrated in FIG. 1.

Since the light shielding member 15 partitions a space below the first display portion 111 and a space below the second display portion 112, it is possible to prevent the light emitted from the first light emitting element 16 located below the first display portion 111 from being applied to the gradation sheet 12 and causing the second display portion 112 to emit light. Similarly, it is possible to prevent the light emitted from the second light emitting element 17 located below the second display portion 112 from being applied to the switch pattern portion of the filter layer 13 and causing the first display portion 111 to emit light.

The light shielding member 15 is made of a material having low visible light transmittance, such as acrylonitrile-butadiene-styrene (ABS). The light shielding member 15 is fixed to, for example, the base material 10.

The vehicle interior panel 1 includes a touch sensor 14 for detecting a touch operation on the first display portion 111. Further, in response to detection of the touch operation on the first display portion 111 by the touch sensor 14, the pattern of the gradation sheet 12 is displayed on the second display portion 112 due to the application of light, as an answer back.

In the example illustrated in FIG. 1, the vehicle interior panel 1 includes an electrostatic capacitance type touch sensor 14 as a switch of an electronic device. An electrode 141 provided on the second surface 102 side of the base material 10 illustrated in FIG. 1 is an electrode included in the touch sensor 14 for generating an electric field.

As illustrated in FIG. 1, the electrode 141 is provided below the first display portion 111. That is, the electrode 141 and the first display portion 111 overlap in position in the planar direction. Therefore, an electrostatic capacitance of a pseudo capacitor formed between a hand and the electrode 141 is changed by bringing the hand close to the first display portion 111 having the pattern of the switch from the front surface 110 side of the vehicle interior panel 1, and the change in the electrostatic capacitance can be detected as the touch operation. Note that the touch operation may be detected when the hand is in contact with the first display portion 111 or when the hand approaches the first display portion 111 to some extent.

The electrode 141 transmits light emitted from the first light emitting element 16. A planar shape of the electrode 141 is, for example, circular or rectangular, but is not limited thereto, and can be set according to the shape or size of the first display portion 111.

The means for detecting the touch operation of the vehicle interior panel 1 is not limited to the electrostatic capacitance type touch sensor 14 described above, and may be a physical switch, for example. When the physical switch is used, for example, a microswitch is installed at a position of the electrode 141, and the operation is detected by turning on the microswitch due to deformation of the base material 10 by the touch operation on the first display portion 111.

Figure 5:
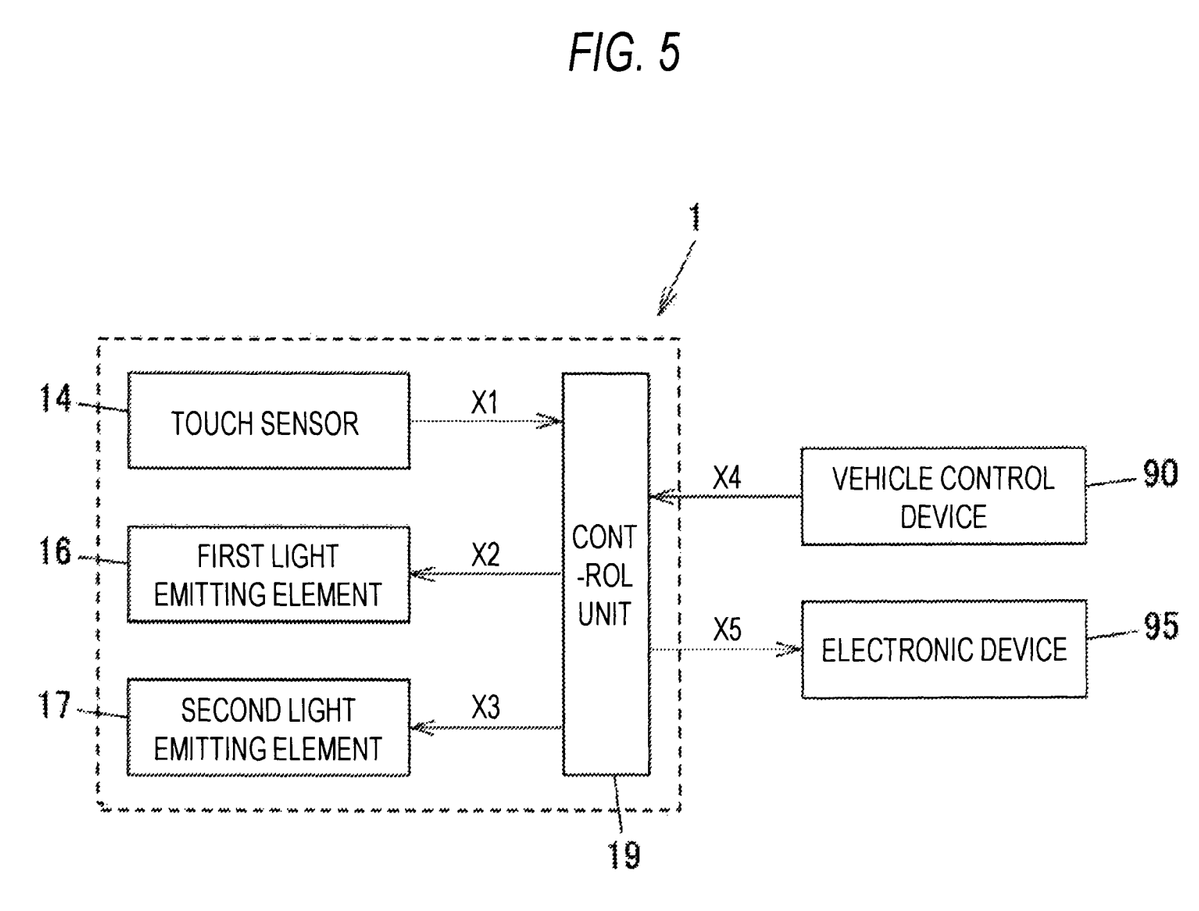
FIG. 5 is a block diagram illustrating a configuration example of a system related to an operation of the vehicle interior panel.

FIG. 5 is a block diagram illustrating a configuration example of a system related to the operation of the vehicle interior panel 1 according to the embodiment of the present disclosure.

The first light emitting element 16 and the second light emitting element 17 are electrically connected to a control unit 19. The first light emitting element 16 emits light based on a light emitting instruction signal X2 transmitted from the control unit 19. The second light emitting element 17 emits light based on a light emitting instruction signal X3 transmitted from the control unit 19.

The touch sensor 14 is electrically connected to the control unit 19, and transmits a detection signal X1 corresponding to a change in the detected electrostatic capacitance to the control unit 19.

The control unit 19 is connected to an electronic device 95 mounted on the vehicle, which is an object to be operated by the touch operation on the first display portion 111, for example, an air conditioner, illumination, an electric center console box, or the like, and transmits operation instruction information X5 for operating the objects to be operated. The control unit 19 may be connected to a vehicle control device 90 such as an electronic control unit (ECU) that performs setting of the entire vehicle and control of an automatic driving function, and may be configured to receive vehicle information X4 including information such as a state of the vehicle.

The control unit 19 is, for example, a microcomputer including a central processing unit (CPU) that performs calculation, processing, and the like on acquired data according to a stored program, a random access memory (RAM) and a read only memory (ROM) that are semiconductor memories. The ROM stores, for example, a program for operating the control unit 19. The RAM is used as, for example, a storage area for temporarily storing calculation results and the like.

The control unit 19 may be included in the vehicle interior panel 1 or may be included outside the vehicle interior panel 1, for example, in the vehicle control device 90.

Figure 6:
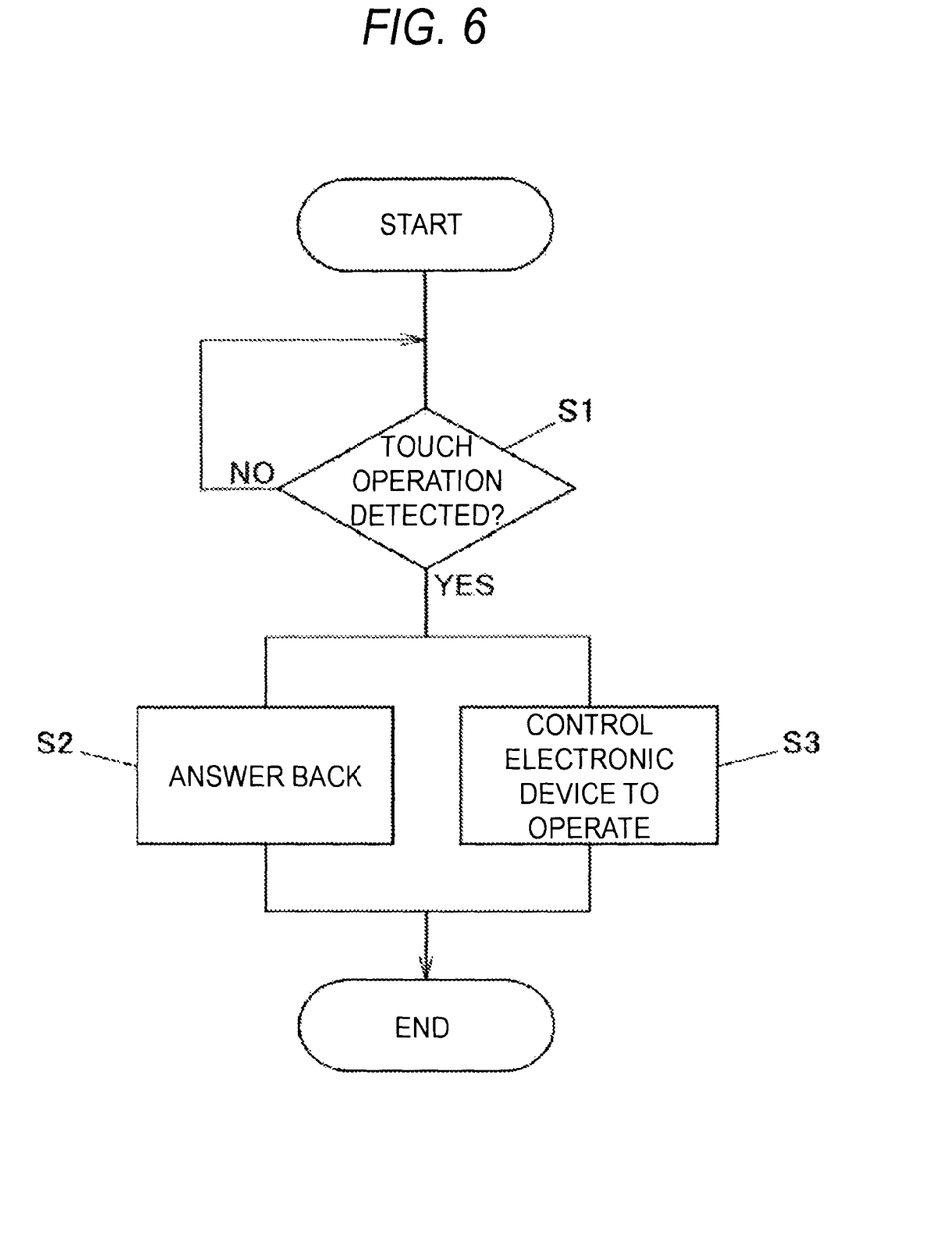
FIG. 6 is a flowchart illustrating an example of operation control of an electronic device using the vehicle interior panel.

FIG. 6 is a flowchart illustrating an example of operation control of the electronic device using the vehicle interior panel 1 according to the embodiment of the present disclosure.

When the control unit 19 receives, from the touch sensor 14, the detection signal X1 notifying that the touch operation on the first display portion 111 has been detected (step S1), the control unit 19 transmits the light emitting instruction signal X3 to the second light emitting element 17, causes the second light emitting element 17 to emit light, and causes the second display portion 112 to light-display the pattern of the gradation sheet 12 for a predetermined time as an answer back (step S2). In parallel with step S2, the control unit 19 transmits the operation instruction information X5 corresponding to the touched first display portion 111 to the corresponding electronic device 95 and causes the electronic device 95 to operate (step S3).

In step S2, a light emitting area, a light emitting pattern, or the like of the second display portion 112 may be changed to display which one of the plurality of first display portions 111 is touched.

The first light emitting element 16 emits light triggered by, for example, start of a driving device of the vehicle or unlocking of the vehicle, and causes the first display portion 111 to continuously emit light until the driving device stops, for example. When the control unit 19 receives the vehicle information X4 including information indicating that the start of the driving device of the vehicle, the unlocking of the vehicle, or the like is executed from the vehicle control device 90, the control unit 19 transmits the light emitting instruction signal X2 to the first light emitting element 16, cause the first light emitting element 16 to emit light, and causes the first display portion 111 to emit light.

As the answer back in step S2, the first light emitting element 16 below the touched first display portion 111 may be caused to emit light in a color different from that before the touch operation or may be caused to blink. In this case, the control unit 19 also transmits a light emitting instruction signal to the first light emitting element 16 to cause the first light emitting element 16 to emit light in a different color or blink. Here, in a case where the first light emitting element 16 emits light in the different color, a method of switching the light emitting elements by using a plurality of first light emitting elements 16 having different emission colors, a method of switching the emission colors by using the first light emitting element 16 capable of emitting light in a plurality of colors such as a full-color LED, or the like can be used. In this case, the first light emitting elements 16 are disposed below the first display portions 111 that are in contact with each other, and the space below the first display portions 111 adjacent to each other is partitioned by the light shielding member 15.

Modification

Figure 7:
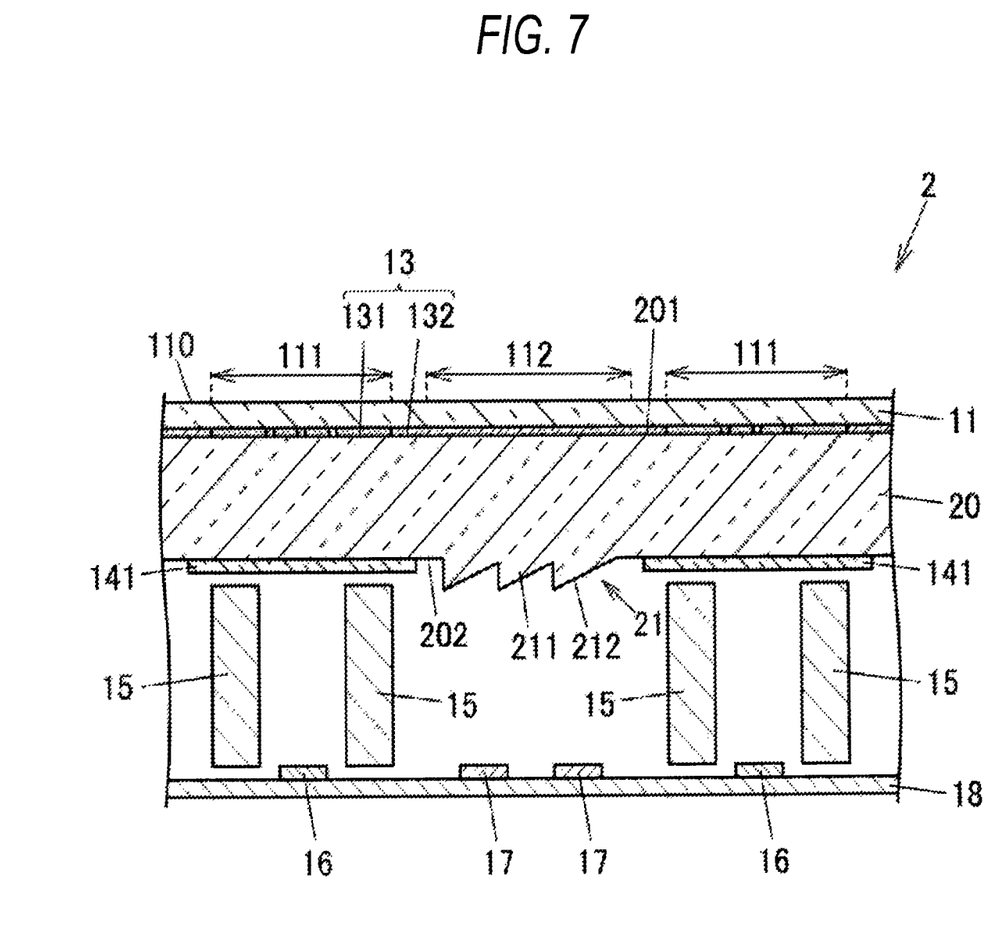
FIG. 7 is a vertical cross-sectional view of a part of a modification of the vehicle interior panel.

FIG. 7 is a vertical cross-sectional view of a part of a vehicle interior panel 2 which is a modification of the vehicle interior panel 1 according to the embodiment of the present disclosure. The vehicle interior panel 2 is different from the vehicle interior panel 1 in that a transparent member 21 is provided as a pattern portion instead of the gradation sheet 12.

The transparent member 21 includes protrusions 211 as gradation portions, and each of the protrusions 211 has an inclined surface 212 inclined with respect to the second surface 102 of the base material 10. Of the light emitted from the second light emitting element 17, an amount of light refracted by the inclined surface 212 extracted from the front surface 110 continuously changes in an in-plane direction to form the gradation pattern 113. That is, similarly to the gradation sheet 12, the transparent member 21 includes at least a gradation portion in which the light transmittance continuously changes in the planar direction. Further, since light is not transmitted from a vertex portion of the protrusion 211, the outline of the gradation pattern 113 can be expressed.

Similarly to the gradation sheet 12, the transparent member 21 is provided on the second surface 202 that is a surface opposite to the front surface 110 of a base material 20. The base material 20 is a plate-shaped member made of the same material as the base material 10 of the vehicle interior panel 1. Further, the transparent member 21 is typically formed as a part of the base material 20 as illustrated in FIG. 7, but the transparent member 21 formed as a separate component from the base material 20 may be attached to the second surface 202 that is the surface opposite to the front surface 110 of the base material 20.

In order to make the shading of the pattern of the transparent member 21 light-displayed on the front surface 110 clear, the base material 20 preferably has a smoke color.

Effects of Embodiment

According to the vehicle interior panels 1 and 2 of the embodiment of the present disclosure, by displaying the pattern of the pattern portions such as the gradation sheet 12 and the transparent member 21 on the front surface 110 due to the application of light, it is possible to maintain a high design property even under an environment with less external light such as at nighttime. Further, the vehicle interior panels 1 and 2 can be used as a switch device capable of maintaining high design property even under an environment with less external light, such as at nighttime, by using the light-display of the pattern of the pattern portion as an answer back of the touch operation on the first display portion 111 on which the pattern of the switch of the electronic device 95 is displayed.

Although the embodiment of the present disclosure has been described above, the present invention is not limited to the embodiment described above, and various modifications can be made without departing from the gist of the invention. Constituent elements according to the embodiment described above can be freely combined without departing from the gist of the invention.

The embodiment described above does not limit the invention according to the scope of the claims. Further, it should be noted that all combinations of the features described in the embodiment are not necessarily essential to the solution of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

What is claimed is:

1. A vehicle interior panel having a front surface as a design surface, comprising:
a base material being in a plate-shape and having optical transparency;
a decorative layer provided on a first surface of the base material and having optical transparency, the first surface being a surface on the front surface side; and
a pattern portion provided on a second surface of the base material and having a pattern that is displayed on the front surface by emission of light from a side opposite to the front surface, the second surface being opposite to the first surface,
wherein the pattern portion includes a gradation portion in which light transmittance continuously changes in a planar direction, and
a gradation pattern is displayed on the front surface by emission of light from the side opposite to the front surface to the gradation portion.

2. The vehicle interior panel according to claim 1, wherein the front surface includes a first display portion on which a pattern of a switch of an electronic device is displayed, and a second display portion on which a pattern of the pattern portion is displayed due to application of light.

3. The vehicle interior panel according to claim 2, further comprising:
a touch sensor configured to detect a touch operation on the first display portion,
wherein the pattern of the pattern portion is displayed on the second display portion due to the application of light, as an answer back, in response to detection of the touch operation on the first display portion by the touch sensor.

4. The vehicle interior panel according to claim 2, wherein at least a part of the gradation pattern has a gradation in brightness, in an area of the second display portion adjacent to the first display portion, in which brightness on a side closed to the first display portion is low and brightness on a side closed to a center of the second display portion is high.

5. The vehicle interior panel according to claim 2, further comprising:
a switch pattern portion provided between the base material and the decorative layer and having a pattern of the switch displayed on the first display portion by emission of light from the side opposite to the front surface; and
a wall-like light shielding member provided to surround a periphery of a space of the pattern portion on the side opposite to the front surface.

6. The vehicle interior panel according to claim 1, wherein the pattern portion is a gradation sheet.

7. The vehicle interior panel according to claim 1, wherein the pattern portion is a transparent member including a protrusion serving as the gradation portion, and
the protrusion has an inclined surface inclined with respect to the second surface.

* * * * *